(12) United States Patent
Taylor (10) Patent No.: US 8,966,997 B2
(45) Date of Patent: Mar. 3, 2015

(54) PRESSURE SENSING MAT

(71) Applicant: Stryker Corporation, Kalamazoo, MI (US)

(72) Inventor: Geoffrey L. Taylor, Winnipeg (CA)

(73) Assignee: Stryker Corporation, Kalamazoo, MI (US)

( * ) Notice: Subject to any disclaimer, the term of this patent is extended or adjusted under 35 U.S.C. 154(b) by 197 days.

(21) Appl. No.: 13/644,961

(22) Filed: Oct. 4, 2012

(65) Prior Publication Data

US 2013/0091961 A1   Apr. 18, 2013

Related U.S. Application Data (60) Provisional application No. 61/546,546, filed on Oct. 12, 2011.

(51) Int. Cl.
   *G01L 1/22*   (2006.01)
   *G01L 3/00*   (2006.01)
   (Continued)

(52) U.S. Cl.
   CPC ... *G01L 5/00* (2013.01); *B32B 5/26* (2013.01); *D04H 3/00* (2013.01); *B32B 5/024* (2013.01);
   (Continued)

(58) Field of Classification Search
   CPC .......... G01L 1/205; G01L 1/228; G01L 1/16; G01L 1/20; A61B 2562/046; A61B 2562/0247; A61B 5/1036; A61B 5/6892
   USPC ............. 73/862.046, 172, 818, 849, 862.043, 73/862.474, 862.621, 862.637
   See application file for complete search history.

(56) References Cited

U.S. PATENT DOCUMENTS 4,715,235 A * 12/1987 Fukui et al. ................ 73/862.68
5,079,949 A   1/1992 Tamori
(Continued)

FOREIGN PATENT DOCUMENTS

EP   2081000   7/2009
GB   2332063   6/1999
(Continued)

OTHER PUBLICATIONS

J.C. Barbenal et al., "Monitoring the mobility of patients in bed", Medical and Biological Engineering and Computing, pp. 466-468, Sep. 1985.
(Continued)

*Primary Examiner* — Lisa Caputo
*Assistant Examiner* — Jonathan Dunlap
(74) *Attorney, Agent, or Firm* — Warner Norcross & Judd LLP (57) ABSTRACT

A pressure sensing sheet includes at least first, second, and third layers wherein the first and third layers each have conductive paths defined therein that are separated by nonconductive spacers. The orientation of the conductive paths of the first layer are transverse to the orientation of the conductive paths of the third layer. The second layer is made of material that has an electrical characteristic that changes with applied pressure, such as, but not limited to, piezoresistive or piezoelectric material. The first and/or third layers are made from multi-material sheets wherein a first type of material will repel conductive particles when subjected to an autocatalytic coating process, while the second type of material will bond with the conductive particles during the autocatalytic coating process. The use of different materials in the first and/or third layers facilitates the manufacturing of the conductive paths and nonconductive spacers.

24 Claims, 4 Drawing Sheets

(51) Int. Cl.
*G01D 7/00* (2006.01)
*G01L 5/00* (2006.01)
*B32B 5/26* (2006.01)
*D04H 3/00* (2012.01)
*B32B 5/02* (2006.01)
*B32B 3/04* (2006.01)
*D04H 3/04* (2012.01)
*G01L 1/14* (2006.01)
*G01L 1/16* (2006.01)
*G01L 1/18* (2006.01)
*G01L 1/20* (2006.01)

(52) U.S. Cl.
CPC . *B32B 5/026* (2013.01); *B32B 3/04* (2013.01); *B32B 2255/02* (2013.01); *B32B 2255/205* (2013.01); *B32B 2262/0261* (2013.01); *B32B 2262/0276* (2013.01); *B32B 2262/14* (2013.01); *B32B 2307/20* (2013.01); *B32B 2479/00* (2013.01); *B32B 2535/00* (2013.01); *D04H 3/04* (2013.01); *G01L 1/146* (2013.01); *G01L 1/16* (2013.01); *G01L 1/18* (2013.01); *G01L 1/205* (2013.01)
USPC ............ 73/862.044; 73/862.045; 73/862.042; 73/862.043; 73/862.041

(56) References Cited

U.S. PATENT DOCUMENTS

| | | | |
|---|---|---|---|
| 5,209,126 A * | 5/1993 | Grahn | 73/862.046 |
| 5,234,065 A | 8/1993 | Schmidt | |
| 5,515,738 A | 5/1996 | Tamori | |
| 5,571,973 A | 11/1996 | Taylot | |
| 5,800,480 A * | 9/1998 | Augustine et al. | 607/96 |
| 6,033,432 A * | 3/2000 | Augustine et al. | 607/96 |
| 6,155,120 A | 12/2000 | Taylor | |
| 6,210,427 B1 * | 4/2001 | Augustine et al. | 607/96 |
| 6,216,545 B1 | 4/2001 | Taylor | |
| 6,387,542 B1 | 5/2002 | Kozlov | |
| 6,497,720 B1 | 12/2002 | Augustine | |
| 6,543,299 B2 | 4/2003 | Taylor | |
| 6,585,328 B1 | 7/2003 | Oexman | |
| 6,721,980 B1 | 4/2004 | Price | |
| 6,853,306 B1 | 2/2005 | Nitschke | |
| 7,155,273 B2 | 12/2006 | Taylor | |
| 7,161,084 B2 * | 1/2007 | Sandbach | 174/117 M |
| 7,201,063 B2 | 4/2007 | Taylor | |
| 7,301,351 B2 * | 11/2007 | Deangelis et al. | 324/687 |
| 7,331,245 B2 * | 2/2008 | Nishimura et al. | 73/862.046 |
| 7,365,031 B2 | 4/2008 | Swallow | |
| 7,493,810 B2 * | 2/2009 | Walczyk et al. | 73/172 |
| 7,814,801 B2 * | 10/2010 | Inamori | 73/849 |
| 7,984,544 B2 * | 7/2011 | Rosenberg | 29/595 |
| 8,161,826 B1 | 4/2012 | Taylor | |
| 2001/0042412 A1 | 11/2001 | Serban | |
| 2002/0134116 A1 * | 9/2002 | Sandbach | 66/202 |
| 2002/0194934 A1 | 12/2002 | Taylor | |
| 2005/0241409 A1 | 11/2005 | Taylor | |
| 2005/0268962 A1 * | 12/2005 | Gaudiana et al. | 136/255 |
| 2006/0255903 A1 * | 11/2006 | Lussey et al. | 338/47 |
| 2006/0260417 A1 | 11/2006 | Son | |
| 2007/0125181 A1 | 6/2007 | Ofek | |
| 2008/0200085 A1 | 8/2008 | Van Bruggen | |
| 2008/0221399 A1 * | 9/2008 | Zhou et al. | 600/301 |
| 2009/0056020 A1 | 3/2009 | Caminade | |
| 2009/0056027 A1 | 3/2009 | Ball et al. | |
| 2009/0099480 A1 | 4/2009 | Salgo | |
| 2009/0183312 A1 * | 7/2009 | Price et al. | 5/706 |
| 2010/0094139 A1 | 4/2010 | Brauers | |
| 2010/0095462 A1 | 4/2010 | Bobey | |
| 2010/0308846 A1 | 12/2010 | Camus | |
| 2011/0068939 A1 | 3/2011 | Lachenbruch | |
| 2012/0116251 A1 | 5/2012 | Ben-Shalom | |

FOREIGN PATENT DOCUMENTS

| | | |
|---|---|---|
| JP | 2000175904 A | 6/2000 |
| JP | 20000316915 A | 11/2000 |
| JP | 2000000214 | 1/2001 |
| JP | 2001000401 A | 1/2001 |
| JP | 2001037821 A | 2/2001 |
| JP | 2004180804 | 7/2004 |
| JP | 2005013259 | 1/2005 |
| JP | 2005204930 | 8/2005 |
| JP | 2005218604 | 8/2005 |
| JP | 2008049023 | 3/2008 |
| KR | 10-0878038 | 1/2009 |
| WO | 2005/000108 | 1/2005 |
| WO | 2005104904 | 11/2005 |
| WO | 2009013981 | 1/2009 |
| WO | 2009120270 | 10/2009 |
| WO | 2010101633 | 9/2010 |
| WO | 2013055725 | 4/2013 |

OTHER PUBLICATIONS

Charles F. Babbs, et al., "A Pressure-Sensitive Mat for Measuring Contact Pressure Distributions . . .", Biomedical Instrumentation and Technology, pp. 363-370, Sep./Oct. 1990.
Apr. 5, 2010 Webpages from www.swicofil.com/textile_metallization.html.
International Search Report for PCT/US2012/059440, the international counterpart to U.S. Appl. No. 13/644,961.
International Written Opinion for PCT/US2012/059440, the international counterpart to U.S. Appl. No. 13/644,961.

* cited by examiner

PRESSURE SENSING MAT

CROSS-REFERENCE TO RELATED APPLICATIONS

This application claims priority to U.S. provisional patent application 61/546,546 filed Oct. 12, 2011 by applicant Geoffrey L. Taylor and entitled PRESSURE SENSING MAT, the complete disclosure of which is hereby incorporated herein by reference.

BACKGROUND OF THE INVENTION

The present invention relates to sensing mats for sensing the pressure experienced by a person or object, and more particularly to sensing mats used to sense the interface pressure experienced by a person lying on a support structure, such as, but not limited to, a bed, stretcher, surgery table, cot, wheelchair, or the like.

SUMMARY OF THE INVENTION

The present invention relates to pressure sensing sheets, their manufacture, and their use in conjunction with other devices, such as, but not limited to, inflatable mattresses and/or cushions.

According to a first embodiment, a pressure sensing mat is provided that includes first, second, and third layers of fabric. The first layer includes rows of electrically conductive strips separated by nonconductive spacers, and the first layer of fabric is made of at least two different types of material that are woven, knitted, or similarly integrated together. The first type of material is positioned at the nonconductive spacers and the second type of material is positioned at the conductive strips. The second layer of fabric includes pressure sensitive material having one or more electrical characteristics that change with applied pressure. The third layer of fabric includes columns of electrically conductive strips separated by nonconductive spacers, and the second layer of fabric is positioned between the first and third layers of fabric.

According to another embodiment, a system for controlling fluid pressure in an inflatable mattress is provided. The system includes a mattress, a sensing mat, and a controller. The mattress is adapted to support a patient and includes a plurality of fluid bladders or fluid cells and a plurality of fluid zones wherein each fluid zone may be inflated or deflated separately from each other fluid zone. The sensing mat is adapted to detect pressure exerted by a patient onto the mattress and the mat includes a plurality of individual pressure sensors corresponding to each of the plurality of fluid zones. The controller is adapted to control the inflation of at least one fluid zone based upon at least two pressure sensors corresponding to the at least one fluid zone.

According to still another embodiment, a method of manufacturing a pressure sensor is provided that includes providing a first layer of fabric having rows of a first type of material woven or knitted together with rows of a second type of material; providing a second layer of fabric impregnated with pressure sensitive material; providing a third layer of fabric having columns of a first type of material woven or knitted together with columns of a second type of material; bathing the first and third layers of fabric in a liquid solution that includes electrically conductive particles wherein the electrically conductive particles adhere to the second type of material but not the first type of material; positioning the second layer of fabric between the first and third layers of fabric; and electrically coupling each of the rows and columns that have the electrically conductive particles adhered thereto to a control circuit.

According to still other aspects, the first type of material may be polyester, while the second type of material may include nylon. In some embodiments, the second type of material may be a combination of nylon and spandex (polyurethane-polyurea copolymer). The first, second, and third layers, in some embodiments, are elastically stretchable in two mutually orthogonal directions. In some embodiments, this elastic stretchability is at least one percent of the length and at least one percent of the width of the layers. In other embodiments, this elastic stretchability may be up to, or more than, thirty percent of the length and thirty or more percent of the width of the layers. The pressure sensitive second layer may be a piezoresistive layer, a piezoelectric layer, a capacitive layer, or an inductive layer. A control module is provided that reads the pressure values from each of the pressure sensors. In some embodiments, the control module functions as a web server that allows a computer, smart phone, or other electronic device with a web browser to access the control module and the data from the sensing sheet. Other aspects of the invention are discussed in both the following written description and in the claims.

Before the embodiments of the invention are explained in greater detail, it is to be understood that the invention is not limited to the details of operation or to the details of construction and the arrangement of the components set forth in the following description or illustrated in the drawings. The invention may be implemented in various other embodiments and is capable of being practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE EMBODIMENTS

Figure 1:
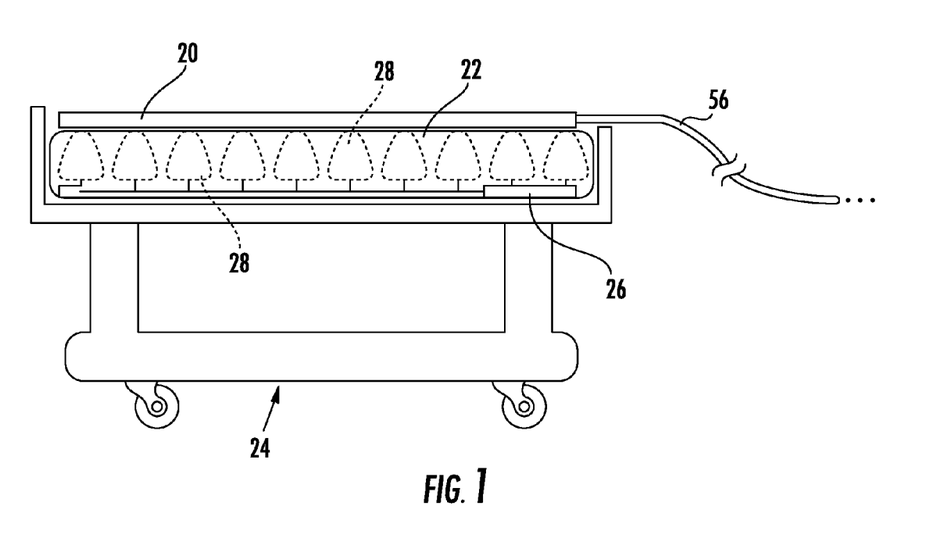
FIG. 1 is a diagram of a pressure sensing mat according to one aspect of the present invention in which the sensing mat is positioned on top of a mattress supported on a patient support apparatus.

A sensing mat 20 according to one aspect of the present invention is depicted in FIG. 1. In this embodiment, sensing mat 20 is positioned on top of a mattress 22 that is, in turn, supported on a patient support apparatus 24, or other type of support. The patient support apparatus 24 may be a bed, stretcher, cot, gurney, surgical table, wheelchair, stationary chair, or other item that is used to support a patient in a healthcare setting. In other embodiments, the sensing mat 20 and mattress 22 are positioned on items used outside of the healthcare setting, such as residential bedding. In still other embodiments, sensing mat 20 is used separately from mattress 22, or any other type of cushioned support. For example, in some embodiments, sensing mat 20 is incorporated into an article of clothing, or other object, that is worn by, or placed over, a person. In some embodiments, sensing mat 20 is incorporated into a sock for sensing the pressures experienced by a person's foot while walking, running, or performing other activities. In still other embodiments, sensing mat 20 is incorporated into a shirt, pants, hat, or other items of clothing.

For purposes of the following description, the construction and operation of sensing mat 20 will be described with respect to its use on a patient support apparatus. However, this is done for illustrative purposes only. As discussed, sensing mat 20 has broad applications to other fields of use besides sensing interface pressures experienced by a patient while positioned on a patient support apparatus.

When used on a patient support apparatus, a residential bed, or any other type of cushioned support, sensing mat 20 is adapted to detect the amount of pressure the person supported on the mat 20 is experiencing due to mattress 22, or whatever other structure happens to be beneath the person. By determining the amount of this pressure, as well as its location relative to the patient's body, steps may taken, if desirable, to reduce this pressure so as to decrease the likelihood of pressure sores developing on the patient. Such steps may include issuing an alarm to caregivers who take the proper preventive actions (such as turning the patient, or other steps), or it may include issuing electronic communications to other electronic structures that automatically take steps to relieve those pressures deemed to be higher than desirable.

For example, in one embodiment (not shown in FIG. 1), mat 20 communicates directly with a mattress controller 26 positioned inside of mattress 26 that automatically adjusts the inflation level inside one or more fluid bladders or cells 28 within mattress 22 so that high patient pressures are reduced. In some embodiments, mattress 22 includes inflatable cells instead of bladders. Such inflatable cells may be defined by flexible structural walls that generally resist changes in their shape, regardless of inflation, but instead change their flexibility in response to pressure changes in the fluid inside of the cell. Regardless of whether cells or bladders 28 are used, the interior of the cell or bladder 28 may be empty, or it may include additional material, such as, but not limited to, any pliable or cushioning material, such as open celled foam, or other material that provides cushioning and shape definition even when the cell or bladder is deflated. Shape memory metal or plastic may also be used with the bladders or cells 28 to control the shape of any of the surfaces of the bladder or cell, such as, but not limited to, the surface which will interface with the patient or other person (e.g. top surface).

In some embodiments, mattress controller 26 is positioned inside of mattress 22, while in other embodiments, mattress controller 26 is positioned entirely outside of mattress 22. In still other embodiments, mattress controller 26 is distributed amongst multiple locations, one or more of which may be inside mattress 22 and one or more of which may be outside of mattress 22. Mattress controller 26 may be a commercially available controller that is sold as part of a powered mattress, or it may be a custom designed controller. Regardless of its commercial availability, mattress controller 26 will include a set of electronic components that are designed to carry out the functions of controlling the inflation and deflation of the bladders or cells 28, and communicating with pressure mat 20. Such components may include one or more microprocessors, microcontrollers, field programmable gate arrays, systems-on-a chip, volatile or non-volatile memory, discrete circuitry, and/or other hardware, software, or firmware.

In other embodiments, sensing mat 20 communicates pressure information to a hospital computer network that is capable of forwarding the information to any number of potential devices and/or software applications running on the hospital network. Such communication may take place via a wireless transceiver integrated into sensing mat 20, such as, but not limited to, a Wi-Fi transceiver (IEEE 802.11), or other wireless transceiver, that communicates with a wireless access point of the healthcare computer network. In yet another embodiment, sensing mat 20 communicates pressure information to a pendant that is positioned on the bed, or to an in-room medical hub that is positioned within the room. An example of one such in-room medical hub is a CareAware iBus Connectivity Engine marketed by Cerner Corporation, which is headquartered in Kansas City, Mo. Other types of in-room hubs may also be used.

In general, sensing mat 20 may be used in any of the manners disclosed in copending U.S. provisional application Ser. No. 61/449,182 entitled Sensing System for Patient Supports, filed by applicant Richard Derenne on Mar. 4, 2011, the complete disclosure of which is hereby incorporated herein by reference. Sensing mat 20 may also be used in other manners beyond those described in this '182 patent application.

Figure 2:
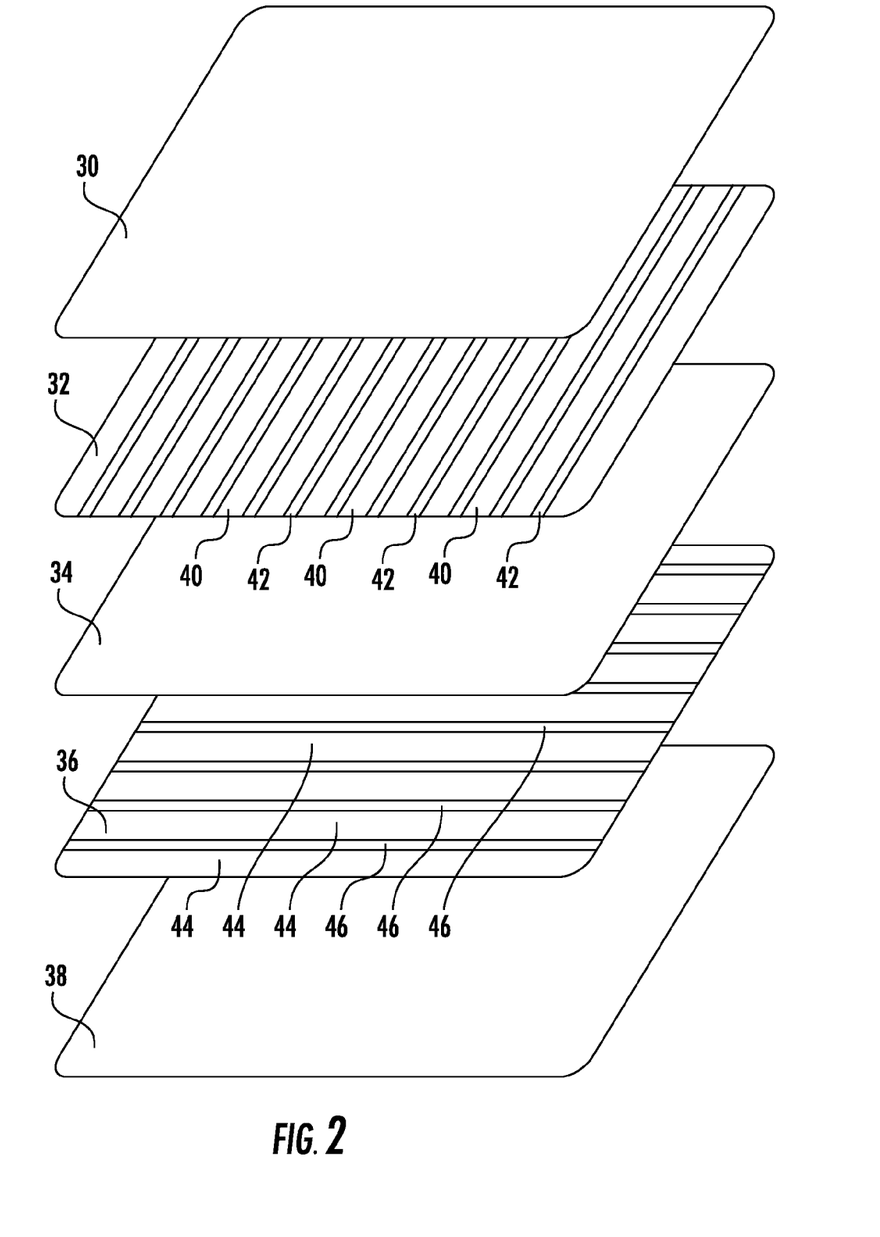
FIG. 2 is a perspective, exploded diagram of the pressure sensing mat of FIG. 1 illustrating the various layers that may be included within the mat.

FIG. 2 illustrates one manner in which sensing mat 20 can be constructed. In the embodiment shown therein, sensing mat 20 includes a top cover 30, a first layer 32, a second layer 34, a third layer 36, and a bottom cover 38. In at least one embodiment, each layer is made from elastically stretchable material that is able to elastically stretch so that it may conform to the contours of the patient and/or the support surface on which the patient is resting (e.g. the top surface of mattress 22). In some embodiments, the elastic stretchability of each layer may be such that each layer is elastically extendable for at least one percent of its length without extending beyond its elastic limit or exceeding its yield strength. In other embodiments, the elastic stretchability of each layer may exceed ten percent of its length. In still other embodiments, the elastic stretchability may exceed 30%, or even higher. Such elastic stretchability, in at least some embodiments, is present for stretching in at least two mutually perpendicular directions. In other words, sensing mat 20 is designed to elastically stretch both in its width direction and its length direction.

In some embodiments, top cover 30 is made from a waterproof material that is elastically stretchable. Such materials may be available from Eastex Products of Holbrooke, Mass., or Dartex Coatings of Nottingham, United Kingdom. Bottom cover 38 may be made from the same material or a different material. Top cover 30 and bottom cover 38 are sealed together about their periphery to thereby envelope first, second, and third layers 32, 34, and 36.

Figure 3:
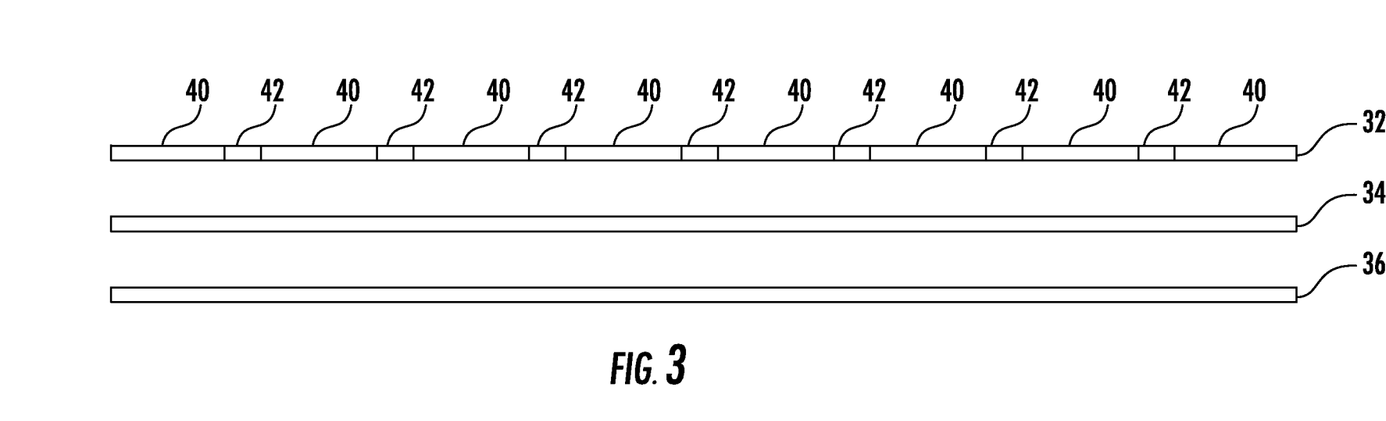
FIG. 3 is a cross section of the three central layers of the pressure sensing mat of FIG. 2.

As shown in FIGS. 2 and 3, first layer 32 includes a plurality of conductive rows 40 that are each separated from each other by way of non-conductive spacers 42. In one embodiment, first layer 32 is constructed from a single layer of fabric that is made from at least two different types of material. The first type of material is positioned in the non-conductive spacers 42 while the second type of material is positioned in the conductive rows 40. The two types of material are, in one embodiment, woven or knitted together, although other means of connecting the two types of materials may be used. The two materials are each generally planar and are attached to each other in an end-to-end fashion. That is, as can be seen in FIG. 3, each conductive row includes a pair of ends 48 and each spacer 42 includes a pair of ends 58. With the exception of those conductive rows 40 positioned at the periphery of first layer 32, the material of each conductive row 40 is connected at its ends 48 to the ends 58 of the adjacent material forming the nonconductive spacers 42.

The first type of material is a material that will naturally repel electrically conductive particles during a manufacturing process described in more detail below. The second type of material is a material that will naturally attract and/or couple to electrically conductive particles during the manufacturing process. More specifically, one or more solvents are used to carry the electrically conductive particles, and the one or more solvents are repelled by the first type of material but have an affinity for the second type of material. This leads to the electrically conductive particles adhering to the second type of material, but not the first type of material. Thus, during the manufacture of first layer 32, electrically conductive particles will be found within conductive rows 40, thereby making these rows 40 electrically conductive; and substantially no conductive particles will be found within non-conductive spacers 42, thereby making these spaces electrically resistive and substantially non-conducting. An electrical voltage supplied to an individual one of any of the conductive rows 40 will therefore not be detectable in any of the other rows due to the presence of the non-conductive spacers 42.

In one embodiment, the first type of material may be polyester while the second type of material may include nylon. In still another embodiment, the first and/or second types of materials may be combinations of multiple materials. For example, in at least one embodiment, the second type of material may be a combination of both nylon and spandex. In still other embodiments, combinations of more than two materials may be positioned within either conductive rows 40 and/or non-conductive spacers 42. While the particular solvent may vary, in at least one embodiment, water is used as a solvent. More specifically, water may be mixed in combination with ammonia, sugar, and silver nitrate to yield a solution in which silver particles are suspended in the fluid. Because the first type of material is hydrophobic, the water molecules (and suspended silver particles) will not adhere to the first type of material. However, because the second material is hydrophilic, the water molecules (and suspended silver particles) will adhere to the second type of material. The adhered silver particles will give the second type of material its electrical conductivity. The chemical equations describing this process are as follows:

$$AgNO_3 + KOH \rightarrow AgOH + KNO_3$$

$$AgOH + 2NH_3 \rightarrow [Ag(NH_3)_2]^+ + [OH]^-$$

$$[Ag(NH_3)_2]^+ + [OH]^- + (glucose/dextrose) \rightarrow Ag + 2NH_3 + H_2O$$

Other solvents besides water can, of course, be used, as well as other conductive metals.

During the manufacture of sensing sheet 20, first layer 32 and third layer 36 are constructed by starting with a single layer of fabric that includes the two or more types of materials. As noted, such materials may include nylon and polyester in one embodiment. Neither one of these materials is electrically conductive. In order to make those areas that include the nylon electrically conductive, first and third layers 32 and 36 are subjected to a chemical bath, or other type of autocatalytic plating coating process, that includes electrically conductive particles. As noted above, in some embodiments, such electrically conductive particles include silver particles. Other types of electrically conductive particles, such as, but not limited to copper, nickel, alloys thereof, or other metallic materials, may of course, be used. Because first layer 32 is constructed of at least two different types of materials—one which attracts the solvent carrying the conductive particles and one which repels the solvent carrying the conductive particles—the result of subjecting first and third layers 32 and 36 to the chemical bath will be the creation of electrically conductive rows 40 that are separated from each other by nonconductive spacers 42. In the embodiment in which first layer is made from nylon and polyester, the electrically conductive particles will stick to the nylon to form conductive rows 40 while the electrically conductive particles will not stick to the polyester, thereby forming nonconductive spacers 42.

In some embodiments, after a slightly conductive layer of electrically conductive particles has been applied to the conductive rows 42 and conductive columns 44 using this method, the conductivity of these rows and columns is enhanced or improved using a conventional electrochemical plating process that adds further conductive material to these rows and columns 42 and 44.

The aforementioned autocatalytic and/or electrochemical plating manufacturing processes avoid the costlier and more time-consuming process used in some prior art sensing sheets, such as, for example, those disclosed in copending U.S. patent application Ser. No. 12/075,937 filed by Geoffrey Taylor on Mar. 15, 2008 and entitled "Adaptive Cushion Method and Apparatus for Minimizing Force Concentrations on a Human Body," the complete disclosure of which is hereby incorporated herein by reference.

In one embodiment, first and third layers 32 and 36, prior to undergoing the aforementioned autocatalytic conductive coating process, are cut from sheets or rolls of products that are commercially available from a plurality of different fabric mills. Such rolls or sheets are sold with the first and second materials (e.g. nylon and polyester) already woven or knit together. The same roll or sheet may be used to make both first and third layers 32 and 36 by changing the orientation of one of layers 32 and 36 with respect to the other. The dimensions of the materials used for making conductive rows 40 and non-conductive spacers 42 (as well as conductive columns 44 and non-conductive strips 46) may be specified to the fabric mill as desired in order to create the desired number of rows and columns in sensing mat 20. As noted, the rolls or sheets, once obtained, are subject to an autocatalytic plating process in which electrically conductive particles, such as silver, copper, nickel, alloys thereof, or other metallic materials, are adhered to, or impregnated with, the specific sheet material that forms conductive rows 40, but are repelled by the material that forms non-conductive spacers 42.

Second layer 34 is an elastically stretchable fabric that includes materials having one or more electrical characteristics that change in response to applied pressure. In one embodiment, layer 34 is a piezoresistive layer in which its electrical resistance changes in response to changing normal forces applied against it. In another embodiment, layer 34 is a piezoelectric layer in which an electrical voltage is generated at different levels depending upon the normal forces applied to it. In still other embodiments, layer 34 may be a capacitive or inductive layer wherein its capacitance and/or inductance varies with changes in applied pressure.

When second layer 34 is a piezoresistive layer, it may be made in any of the manners described in the '937 patent application mentioned above, or in commonly assigned U.S. patent application Ser. No. 12/380,845 filed Mar. 5, 2009 by Geoffrey Taylor and entitled "Elastically Stretchable Fabric Force Sensor Arrays and Methods of Making," the complete disclosure of which is also incorporated herein by reference. The manufacturing process disclosed in this '845 patent application describes a method of making piezoresistive sensors that are elastically stretchable along both their length and width dimensions. Such elastic stretchability includes the ability to elastically stretch up to one to ten percent, and even greater, in both of the mutually orthogonal directions of length and width. Still other manners of making piezoresistive layers of fabric are disclosed in U.S. Pat. No. 6,155,120 issued to Taylor and U.S. patent publication 2002/0194934 filed by Taylor, the disclosures of both of which are hereby incorporated herein in their entirety. Second layer 34 may also be made in still other manners.

Third layer 36 is formed in the same manner as first layer 32. When so formed, the only difference between first layer 32 and third layer 36 is the orientation of their conductive strips. In other words, third layer 36 will include alternating layers of parallel conductive columns 44 and nonconductive strips 46, and if first layer 32 is oriented such that conductive rows 40 extend from a first side of mat 20 to a second side of mat 20, then third layer 36 will be oriented such that its conductive columns 44 and nonconductive strips 46 will extend from a top end to a bottom end of mat 20. The orientation of both first layer 32 and third layer 36 relative to the sides of mat 20 may be changed so long as the relative orientation between these two layers is mutually perpendicular. That is, conductive rows 40 and nonconductive strips 42 of first layer 32 should be perpendicular to conductive columns 44 and nonconductive strips 46 of third layer 36.

When pressure is exerted by a patient on sensing mat 20, this is detected by the change in the corresponding electrical characteristic in second layer 34. If second layer 34 is piezoresistive, it will experience a change in electrical resistance, and this change in electrical resistance is detected by applying a voltage to a selected conductive row 40 of first layer 32 and measuring the voltage detected at a selected conductive column 44 of third layer 36, or vice versa. The measured voltage will vary with the pressure exerted on sensing mat 20 at the location where the selected conductive row 40 and the selected conductive column 44 intersect. This area of intersection is referred to herein as an individual pressure sensor. The pressure in each of these sensors is detected by applying a voltage to each of the conductive strips in one of the first and third layers 32 and 36, and then measuring the voltage detected at each of the conductive strips in the other of the first and third layers 32 and 36. Such measurements may be repeated multiple times a second in order to detect pressure changes in substantially real time. Such measurements result in a determination of the pressure experienced at each sensor within sensing mat 20. By changing the number of rows 40 and columns 44, the resolution of sensing mat 20 can be increased or decreased—that is, the number of locations where pressure is individually measured can be increased or decreased.

As shown in the embodiment of FIG. 3, a wire or other electrical conductor 50 is electrically coupled to each of the conductive strips in each of the first and third layers of sensing mat 20. Each wire 50 further connects to one of two preprocessing circuit boards 52. Each preprocessing circuit board may, in turn, be connected to an electronic control module 54 that is integrated into sensing mat 20. That is, electronic control module 54 may be enveloped within top and bottom covers 30 and 38 so that module 54 is not visible to a user of mat 20. Further, both circuit boards 52 and 54 may be each less than half an inch thick (such as, for example, 2 millimeters), and each may take up less than a square inch of surface area. Such dimensions help to ensure that a patient will not likely be able to feel these circuit boards within mat 20, and thus will not be discomforted by them. This is especially true if the circuit boards 52 and control module 54 are positioned along the edges of the sensing mat 30. Control module 54 may be positioned in a corner at a foot end of sensing mat 20 in order to reduce the likelihood of it being felt by a patient.

Figure 4:
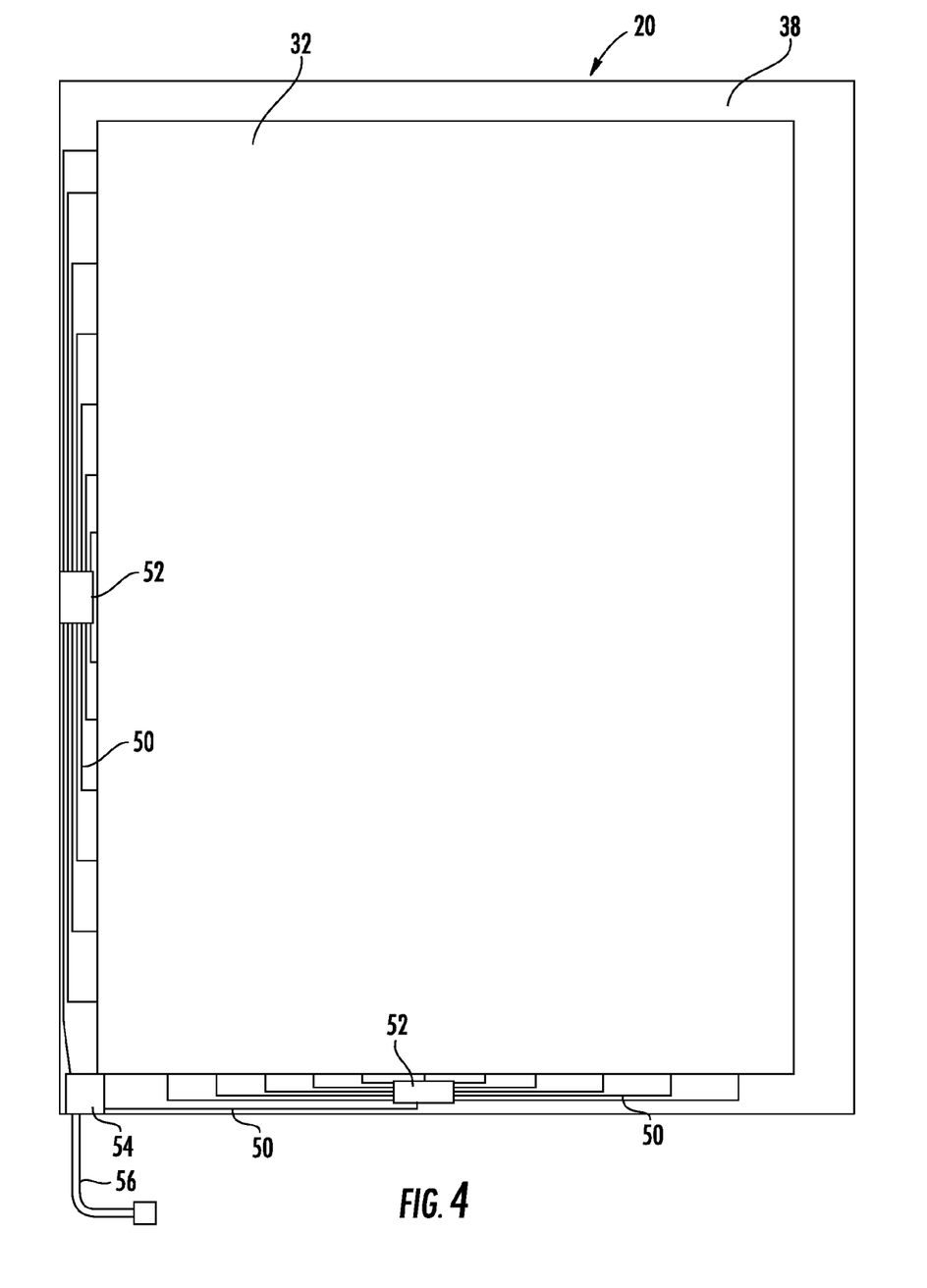
FIG. 4 is a plan diagram of the sensing mat of FIG. 1 shown with a top cover removed in order to illustrate one manner in which the electronic control circuitry may be implemented.

Circuit boards 52 and control module 54 are designed to perform all of the electrical work necessary to determine the pressures being exerted at each of the pressure sensor locations of mat 20. Control module 54 is electrically coupled to a cable 56, such as a standard Universal Serial Bus (USB) cable, that capable of being coupled to a computer, or any other USB enabled device. By performing all, or substantially all, of the processing necessary to determine the pressures being sensed at all of the sensor locations of mat 20, electronic control module 54 need not concern itself with transmitting along cable 56 the raw electrical signals used for detecting and determining pressure. This spares whatever electronic device that module 54 is communicating with from the computational load of processing raw sensor data. The electronic device can therefore use its computation resources for other purposes. Control module 54 may include one or more microprocessors, microcontrollers, field programmable gate arrays, systems-on-a chip, volatile or non-volatile memory, discrete circuitry, and/or other hardware, software, or firmware that is configured and/or programmed to carry out the functions described herein, as would be known to one of ordinary skill in the art.

In some embodiments, electronic control module 54 is in electrical communication with mattress controller 26. In such cases, it may be desirable for at least one of these devices to know how the sensors of mat 20 physically align with the pressure zones of mattress 22. That is, in some embodiments, mat 20 may include upwards of 2000 individual pressure sensors, while mattress 22 may include a much smaller number of individually controllable pressure zones. In order to use the pressure readings from mat 20 in controlling the inflation of bladders or cells 28 within a given pressure zone, it is desirable to know which sensors are positioned above each individual pressure zone. Therefore, in at least some embodiments, electronic control module 54 is configured to output information describing the location of each of its sensors in a manner that mattress controller 26 can use to correlate these positions to the positions of its pressure zones. Such manners may vary.

In one embodiment, the dimensions of mat 20 are output, as well as the total number of sensors for the mat 20. In addition, information identifying at least one reference location—such as, for example, which sensor corresponds to the head end, left corner, or some other specific location—is also output. Regardless of the specific reference location, sufficient information is output so that mattress controller 26 can correlate the output of sensor mat 20 with the inflatable zones of mattress 22. That is, mattress controller 26 can determine, for example, which pressure sensors of mat 20 are positioned above, say, a patient left seat zone, or some other zone. The number, size, and position of the zones of mattress 22, which are each independently controllable for inflation and deflation purposes, can vary from one mattress 22 to another. This is also true for other embodiment where mattress 22 is replaced by some other cushion, such as a wheelchair cushion, which may have multiple independently controllable air zones.

In still other embodiments, the functions of control module 54 and mattress controller 26 are combined together into a single controller. In some of such embodiments, sensing mat 20 is integrated into mattress 22 so that it is no longer separable therefrom. A single controller, such as control module 54, may be used to control bladder or cell inflation and deflation in those embodiments where sensing mat 20 is used with an object other than a mattress, such as a cushion, or other support structure having inflatable bladders or cells.

When control module 54 outputs information indicating that a specific sensor is detecting a pressure that is undesirably high, mattress controller 26 will be able to determine which air zone this corresponds to and adjust the pressure in that zone accordingly. The manner in which mat 20 outputs information about the locations of its sensors may be standardized so that mattresses having different numbers and/or shapes of zones can have their mattress controllers automatically determine the correlation of pressure sensors to pressure zones. Similarly, by outputting location information, different mats 20 having different numbers and/or positions of sensors can "talk" to different mattress controllers and the correlation between sensor locations and pressure zones can be automatically established.

It will also be understood by those skilled in the art that mattress controller 26 may output information to control module 54 in order to establish the correlation between pressure zones and sensor locations. Still further, both mattress controller 26 and control module 54 may output information to a third computer device, such as one on the patient support apparatus, that then correlates the sensor positions to the positions of each of the individually controllable air zones.

In at least one embodiment, sensor mat 20 may be configured to detect pressures that range generally between about 20 to 60 millimeters of mercury. It will, of course, be understood that other detectable ranges of pressure may be used. In at least one embodiment, the size of sensor mat 20 may be up to four feet wide or more, and up to six feet long or more. Further, sensor mat 20 may be incorporated into a mattress cover, or may be separate from any cover on mattress 22. In some embodiments, sensor mat 20 may be placed underneath mattress 22, or it may be integrated into mattress 22.

In some embodiments, first, second, and third layers 32, 34, and 36 are all air permeable so that moisture that might build up within these layers can evaporate. Where such breathability of sensing mat 20 is desired, at least one of top or bottom covers 30 or 38 may also be made of a material that is air permeable in order to allow overall breathability of mat 20.

In some embodiments, mat 20 may include, either in addition to, or in lieu of, cable 56, a mini PC, or other compact scaled down computer that is able to function as a web server for displaying the measurements of the sensors of sensing mat 20. That is, instead of having to connect a display device, such as a computer, an LCD screen, or other structure with a display, to cable 56, any electronic device having a web browser and an Internet connection can be used to wirelessly view the data being generated by sensing mat 20. Such mini PCs are commercially available and generally include one or more microcontrollers or systems-on-a-chip, but do not include a display, keyboard, mouse, or in some cases, a hard drive. Often a Compact Flash, Secure Digital (SD) memory card, or other removable flash memory device is used as its memory. One such mini PC is the Raspberry Pi single-board computer that is commercially available from the Raspberry Pi Foundation in the United Kingdom. Other mini PCs include the Mac Mini, available from Apple Inc. of Cupertino, Calif.; and any of various Mini Android PCs available from different manufacturers. In some embodiments, when the mini PC is included, the mini PC replaces control module 54 (and preprocessing circuit boards 52 in some embodiments) such that the functions carried out by those components are undertaken by the mini PC. In this manner, both the processing of the sensor signals and the communication of the processed results to outside devices is overseen by a single computational unit.

Regardless of the specific mini PC used with mat 20, it is programmed to act, in one embodiment, as a web server that displays the sensors readings from mat 20 on an electronic device having a web browser. This display may be a color coded display where the sensors having a reading above a threshold pressure are color coded a certain color, such as red, while those having pressure readings below the upper threshold are differently color coded. The number of different colors and thresholds may be varied as desired. By programming the mini PC to act as a web server, any personnel, such as a caregiver, can access the data from sensing mat 20 provided they have access to an electronic device with a web browser and an internet connection, or at least a local area network connection. Thus, for example, a caregiver carrying an iPad tablet, a Galaxy tablet, or any smart phone can access the readings of sensing mat 20 wirelessly by using their web browser to navigate to the IP address corresponding to the mini PC. In some instances, the mini PC can be configured to use its Wi-Fi capabilities to connect to the local healthcare network (when used in a healthcare setting). Any device having access to the local healthcare network can then access the information from sensing mat 20, whether that device is a desktop computer that has wired access to the network, or the device is a portable device that may be carried by authorized personnel. In other embodiments, the mini PC can wirelessly communicate directly with the portable electronic device (e.g. tablet, smart phone, etc), using Wi-Fi, or other wireless technology. In still other embodiments, the connection between the mini PC and portable electronic device may be made over the Internet.

Various alterations and changes can be made to the embodiments described herein without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A pressure sensing mat comprising:
   a first layer of fabric having rows of electrically conductive strips separated by nonconductive spacers, said first layer of fabric being made of a first type of material and a second type of material, said first type of material being different from said second type of material, said first type of material and said second type of material being secured together in an end-to-end fashion wherein said first type of material is positioned at said nonconductive spacers and said second type of material is positioned at said conductive strips, wherein said first type of material repels a solution of conductive particles such that when said first type of material is bathed in the solution of conductive particles, said conductive particles do not adhere to said first type of material;
   a second layer of fabric that includes pressure sensing material; and
   a third layer of fabric having columns of electrically conductive strips separated by nonconductive spacers, wherein said second layer of fabric is positioned between said first and third layers of fabric.

2. The mat of claim 1 wherein said first type of material and said second type of material of said first layer are woven together.

3. The mat of claim 1 wherein said first type of material and said second type of material of said first layer are knitted together.

4. The mat of claim 1 wherein said second type of material is made from a material to which conductive particles in the solution will adhere when said second type of material is bathed in the solution of conductive particles.

5. The mat of claim 4 wherein said third layer of fabric is made from said first type of material and said second type of material.

6. The mat of claim 5 where said first type of material of said third layer repels the solution of conductive particles such that when said first type of material of said third layer is bathed in the solution of conductive particles, the conductive particles do not adhere to said first type of material of said third layer; and wherein said second type of material of said third layer is made from a material to which the solution of conductive particles will adhere when said second type of material of said third layer is bathed in the solution of conductive particles.

7. The mat of claim 1 wherein the pressure sensing material of the second layer is piezoresistive material.

8. The mat of claim 1 further including an elastically stretchable top cover and an elastically stretchable bottom cover, said top cover and said bottom cover being sealed together at their periphery, and said first, second, and third layers of fabric being enveloped by said top and bottom covers.

9. The mat of claim 8 wherein said top and bottom cover are elastically stretchable in mutually orthogonal directions by at least ten percent of their length in each of said mutually orthogonal directions.

10. The mat of claim 1 further including an electronic control module, said electronic control module including circuitry for determining an amount of pressure exerted at a plurality of locations on said mat based upon pressure-induced changes in electrical resistance in said second layer of fabric.

11. The mat of claim 10 wherein said electronic control module is configured to act as a wirelessly accessible web server such that an electronic device having web browser software can wirelessly access pressure data indicative of the amount of pressure exerted at the plurality of locations on said mat and display the pressure data on the electronic device.

12. The mat of claim 11 wherein said electronic control module is configured with an IP address that uniquely identifies said electronic control module on a healthcare network.

13. The mat of claim 10 further including a universal serial bus (USB) cable extending from said electronic control module out of an aperture defined between said top and bottom cover, said USB cable including a connector for connecting to an external electronic structure.

14. The mat of claim 1 wherein said first type of material is polyester and said second type of material includes nylon.

15. A pressure sensing mat comprising:
   a first layer of fabric having rows of electrically conductive strips separated by nonconductive spacers, said first layer of fabric being made of a first type of material and a second type of material, said first type of material being different from said second type of material, said first type of material and said second type of material being secured together in an end-to-end fashion wherein said first type of material is positioned at said nonconductive spacers and said second type of material is positioned at said conductive strips;
   a second layer of fabric that includes pressure sensing material; and
   a third layer of fabric having columns of electrically conductive strips separated by nonconductive spacers, wherein said second layer of fabric is positioned between said first and third layers of fabric; and
   wherein said first, second, and third layers of fabric are each elastically stretchable in mutually orthogonal directions by at least one percent of their length in said mutually orthogonal directions.

16. The mat of claim 15 wherein said first, second, and third layers of fabric are elastically stretchable in mutually orthogonal directions by at least ten percent of their length in said mutually orthogonal directions.

17. The mat of claim 15 wherein said first type of material is polyester and said second type of material includes nylon.

18. The mat of claim 15 further including an electronic control module, said electronic control module including circuitry for determining an amount of pressure exerted at a plurality of locations on said mat based upon pressure-induced changes in electrical resistance in said second layer of fabric.

19. A method of making a pressure sensing mat comprising:
   providing a first layer of fabric having rows of a first type of material secured together with rows of a second type of material;
   providing a second layer of fabric having an electrical characteristic that changes in response to normal forces applied thereto;
   providing a third layer of fabric having columns of the first type of material secured together with columns of the second type of material;
   bathing said first and third layers of fabric in a liquid solution that includes electrically conductive particles, said electrically conductive particles adhering to said second type of material but not said first type of material;
   positioning said second layer of fabric between, and in contact with, said first and third layers of fabric; and
   electrically coupling said rows and columns of said second type of material to a controller.

20. The method of claim 19 wherein the electrical characteristic of the second layer of fabric that changes in response to normal forces is electrical resistance.

21. The method of claim 20 wherein said first material is polyester, said second material includes nylon, and said electrically conductive particles include silver particles.

22. The method of claim 21 wherein said bathing is an autocatalytic process.

23. The method of 20 wherein said first and second types of material are secured together by knitting.

24. The method of claim 20 wherein said first and second types of material are secured together by weaving.

* * * * *